US010404046B2

United States Patent
Klotz et al.

(10) Patent No.: US 10,404,046 B2
(45) Date of Patent: Sep. 3, 2019

(54) CONNECTION BOX FOR A SYSTEMS OF AN AIRCRAFT

(71) Applicant: Airbus Operations GmbH, Hamburg (DE)

(72) Inventors: Benjamin Klotz, Hamburg (DE); Sebastian Scheffler, Hamburg (DE); Olaf Gläsker, Hamburg (DE); Malte Fürstenberg, Hamburg (DE); Zoltan Czudar, Hamburg (DE); Ines Dittmann, Hamburg (DE); Bernd Kazmeier, Hamburg (DE); Anja Wessels, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 15/823,023

(22) Filed: Nov. 27, 2017

(65) Prior Publication Data
US 2018/0152013 A1    May 31, 2018

(30) Foreign Application Priority Data
Nov. 29, 2016 (DE) .......................... 10 2016 122 969

(51) Int. Cl.
*H02G 3/18* (2006.01)
*B64C 1/18* (2006.01)
*H02G 3/08* (2006.01)

(52) U.S. Cl.
CPC .............. *H02G 3/185* (2013.01); *B64C 1/18* (2013.01); *H02G 3/081* (2013.01)

(58) Field of Classification Search
CPC .............................. H02G 3/185; H02G 3/081
USPC ......................................... 174/50, 57, 58, 482
See application file for complete search history.

(56) References Cited

U.S. PATENT DOCUMENTS

| 5,117,996 | A  | * | 6/1992  | McShane   | H02G 3/121 |
|-----------|----|---|---------|-----------|------------|
|           |    |   |         |           | 174/57     |
| 6,417,446 | B1 |   | 7/2002  | Whitehead |            |
| 6,848,227 | B2 | * | 2/2005  | Whitty    | H02G 3/22  |
|           |    |   |         |           | 174/482    |
| 6,953,894 | B2 | * | 10/2005 | Ungerman  | H02G 3/086 |
|           |    |   |         |           | 174/502    |

(Continued)

FOREIGN PATENT DOCUMENTS

| CH | 709888 U1     | 12/1978 |
| DE | 29715907 U1   | 8/1998  |
| DE | 102007062193 B4 | 7/2009 |

OTHER PUBLICATIONS

German Search Report, German Search Report for European Patent Application No. 10 2016 122 969.5 dated Jul. 8, 2017.

*Primary Examiner* — Dhiru R Patel
(74) *Attorney, Agent, or Firm* — Lorenz & Kopf LLP

(57) ABSTRACT

A connection box for a system of an aircraft is provided, which includes a plurality of connection boxes, with a holder for holding a line connector for the supply of the system of the aircraft, wherein the system includes, in addition to this connection box, a further connection box with a holder for holding a line connector for the supply of the system of the aircraft. The connection box is configured to receive the further connection box in such a way that both connection boxes can be mounted under an opening in the floor of the aircraft so that both connection boxes are accessible from the opposite side of the floor through the opening in the floor.

17 Claims, 3 Drawing Sheets

(56) References Cited

U.S. PATENT DOCUMENTS

| | | | | |
|---|---|---|---|---|
| 7,166,801 B1 * | 1/2007 | Gretz | ............... | H02G 3/121 |
| | | | | 174/481 |
| 7,388,164 B2 * | 6/2008 | Scanzillo | ............ | H02G 3/185 |
| | | | | 174/482 |
| 8,633,384 B1 * | 1/2014 | Shotey | ............. | H02G 3/126 |
| | | | | 174/50 |
| 8,907,214 B1 * | 12/2014 | Baldwin | ............ | H02G 3/081 |
| | | | | 174/50 |
| 2015/0171572 A1 | 6/2015 | Carbone et al. | | |

* cited by examiner

CONNECTION BOX FOR A SYSTEMS OF AN AIRCRAFT

CROSS-REFERENCE TO PRIORITY APPLICATION(S)

This application claims the benefit of, and priority to, German patent application number 10 2016 122 969.5, filed Nov. 29, 2016. The content of the referenced application is incorporated by reference herein.

TECHNICAL FIELD

Embodiments of the subject matter described herein relate generally to aircraft and aircraft systems. More particularly, embodiments of the subject matter relate to a connection box for a system of an aircraft.

BACKGROUND

Cabins of passenger aircraft comprise, in the floor area, floor connection boxes, known as "FDB" (Floor Disconnect Box) and "PFDB" (Power Floor Disconnect Box). The connection boxes are used to realize a channel-managed entertainment system called "IFE" (In Flight Entertainment). The individual seats of the cabin can each be connected to a "FDB" and a "PFDB" to provide them with energy (PFDB) and data (FDB). The wiring between the floor connection boxes and the seats is currently realized via cable ducts which are mounted on the floorplates.

The different connection boxes are attached by holding devices at the underside of the floor of the cabin of the aircraft. In order to make the connection boxes accessible from the top side of the floor, an opening is formed in the floor of the aircraft cabin above each connection box. The individual "FDB" and "PFDB" are conventionally provided spatially separate from each other, so that for each of these boxes a respective opening in the aircraft floor is to be formed. The number of openings to be formed in the aircraft floor for the realization of the "IFE's" corresponds, in the prior art, to the number of connection boxes. Along its circumference, each of the openings is furthermore to be provided with a reinforcing element. The total number of reinforcing elements to be provided in the prior art thus corresponds to the number of openings formed and thus to the number of connection boxes.

However, the prior art devices and methods for realizing a system with multiple connection boxes in a cabin of an aircraft have the disadvantages of a relatively heavy weight and a relatively expensive installation.

BRIEF SUMMARY

A connection box for a system of an aircraft is provided, which comprises a plurality of connection boxes. The system is preferably a cabin system and may be an entertainment system for the cabin of the aircraft. The aircraft may be a passenger aircraft. The connection box comprises a holder for holding a line connector for the supply of the system of the aircraft. The line connector may be a plug. The system to be supplied comprises, in addition to the connection box, a further connection box with a holder for holding a line connector for the supply of the system of the aircraft. The connection boxes may be attached to one side of a floor beam of an aircraft cabin beneath an opening such that the line connectors are accessible from the opposite side of the floor through the respective opening.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
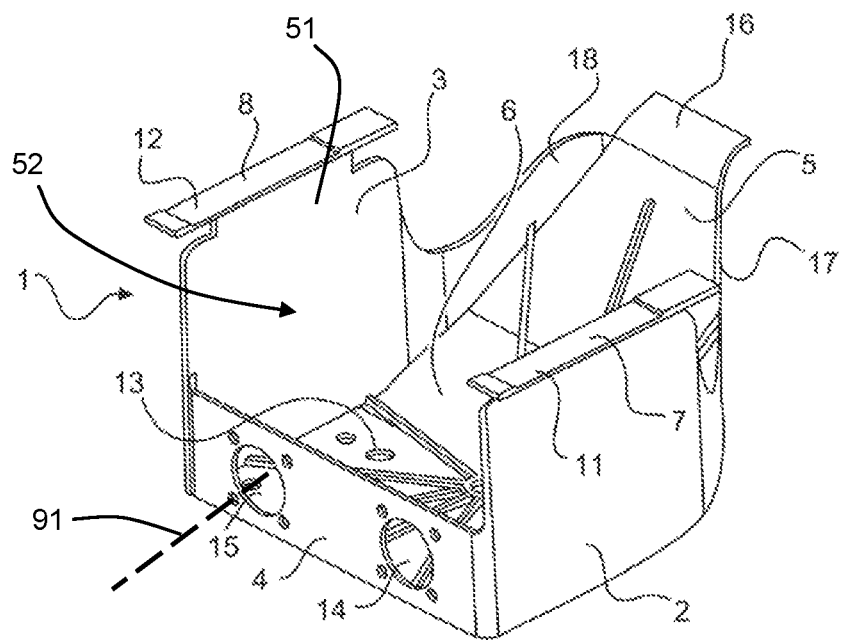
FIG. 1 shows a perspective view of a connection box according to an embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The relatively high weight and the relatively high installation effort of the systems in the prior art are mainly due to the fact that each of the connection boxes requires its own opening in the floor of the aircraft cabin. This high number of openings leads to a relatively high production effort, since each opening must be programmed and manufactured in a manufacturing process of the floor elements. In addition, the high number of reinforcing elements results in a high weight. Thus, as a rule of thumb, it can be roughly estimated that the reinforcing element required to reinforce an opening weighs about three times as much as the material removed from the floor element for the opening. A central idea is therefore to reduce the number of openings in the floor required for the realization of the system of the aircraft.

Advantage is taken of the above teachings and a connection box for a system of an aircraft with multiple connection boxes is provided. The aircraft is preferably a civil aircraft, in particular a passenger aircraft. However, other types of aircraft are also possible here. According to an embodiment, a connection box is understood as a three-dimensional component that provides a connection. The box may comprise a round, semicircular, cornered or other cross-sectional shape. A line can be connected to the connection which is provided by the connection box. The line can be a cable. However, a hose, a pipe or another type of line is also possible here. A combination of different line types is also possible. The system to which the line connector of the connection box is to be connected comprises several connection boxes. The system of the aircraft may preferably be a cabin system. In particular, it is an entertainment system of the aircraft cabin. In this case, the plurality of connection boxes may have at least one connection box for the energy supply of the entertainment system and at least one connection box for the data supply of the entertainment system. Preferably, the connection box according to an embodiment is a connection box for the energy supply of an entertainment system of the cabin of the aircraft. The connection box can in particular provide a connection or preferably a plug for the energy supply of the entertainment system.

The connection box includes a holder for holding a line connector. In the holder, the line connector can be releasably fastened. However, according to an embodiment, it is also conceivable that the holder does not releasably hold the line connector. For example, the line connector can be integrally cast. According to an embodiment, a line connector is understood as a separate component which can establish in particular a releasable connection between two lines. In particular, the line connector is a plug, although other line connectors are also conceivable here. Preferably, a line for the energy supply of an entertainment system of an aircraft cabin can be connected to the plug, which is held in the holder of the connection box.

The system for which the connection box is suitable comprises a further connection box. The further connection box can be a connection box for a cabin system, in particular for an entertainment system of a cabin of an aircraft. In particular, the further connection box can be a connection box for the data supply of an entertainment system of a cabin of an aircraft. However, other connection boxes are also conceivable here. In particular, the further connection box has standardized dimensions. For example, the dimensions of the further connection box can be normalized. If the further connection box is a connection box for the data supply of an entertainment system of a cabin of an aircraft, the further connection box may have known and/or normalized dimensions. For example, the further connection box, in this case, has a length of 142 mm and/or a width of 67 mm and/or a height of 50 mm. Other dimensions are also conceivable here.

The further connection box comprises a holder for holding a line connector for the supply of the system of the aircraft. The further connection box thus supplies the same system as the connection box according to an embodiment. In the holder, the line connector can be releasably held. However, according to an embodiment, it is also conceivable that the holder does not releasably hold the line connector. For example, the line connector can be integrally cast. The connector is in particular a plug, wherein other connectors are also conceivable here. It is preferably a plug with which a cable for the data supply of an entertainment system of a cabin of an aircraft is connectable.

According to an embodiment, the connection box is designed to accommodate the further connection box. The two connection boxes can therefore be coupled according to the an embodiment. Both connection boxes serve to supply the same system of the aircraft. In this case, the connection box according to an embodiment is configured such that the further connection box can be accommodated so that both boxes can be mounted at the underside of a floor of the cabin of the aircraft under an opening in the floor and are accessible from the opposite side of the floor through the opening in the floor. In particular, both line connectors of the two connection boxes are accessible from the opposite side of the floor through the opening.

According to an embodiment, it is thus possible to couple two connection boxes for the same system of an aircraft in such a way that they are accessible via a single opening in the cabin floor of an aircraft. This makes it possible to significantly reduce the number of openings in the cabin floor required for the system. More specifically, the number of openings can be halved according to an embodiment. This in turn means that the manufacturing process is simplified, since fewer openings have to be formed in the floor plates. In addition, the weight can hereby also be significantly reduced, since fewer reinforcing elements are required for openings in the cabin floor.

According to a preferred embodiment, the connection box forms a space in which the further connection box can be accommodated. For example, the connection box therefor comprises a floor, a front wall, a rear wall and two opposite side walls, which form a space for accommodating the further connection box. The space may be open to the top so as to provide good accessibility through an opening in the floor to the line connectors of both connection boxes when mounting the device to the underside of a floor of an aircraft. The top side of the connection box is, according to an embodiment, the side facing the floor when mounting the connection box at the floor. The formation of a space by the connection box for receiving the further connection box allows a space-saving integration of the two boxes into each other. Preferably, the further connection box is accommodated in the one connection box in such a way that the external dimensions of the group of both connection boxes are not or at least not substantially different from the external dimensions of the one connection box alone, i.e. without the further connection box.

According to a preferred embodiment, the space comprises a height of more than 50 mm, preferably more than 70 mm and particularly preferably more than 90 mm. This makes it possible to build the line connector of both connection boxes sequentially on top of each other when receiving the further connection box in the connection box. Furthermore, such heights in particular allow the accommodation of a connection box for the data supply of an entertainment system of an aircraft cabin, which comprises known and/or normalized dimensions.

According to a preferred embodiment, the connection box further comprises at least one opening for receiving a line connector. If the line connector is a plug, the connection box comprises, in particular, a circular opening for receiving the plug therein. The opening is formed in particular on a shorter side wall of the connection box. According to an embodiment, a side wall of the connection box is a wall which extends between the top side and bottom of the connection box, wherein the top side is the side facing the floor when the connection box is mounted at the floor. The connection box may comprise two or more openings which are formed in the same side wall, which is preferably a shorter side wall of the connection box. The opening or the openings can be arranged in the connection box in such a way that they are arranged below a region in which the further connection box is received. Thus, in the lower region of the connection box, a line connector, in particular a plug, can be provided in the opening in the side wall. In this lower region, for example, a plug for the energy supply of an entertainment system of an aircraft cabin can be provided. Above this lower area, a space for the further connection box can also be provided. In this space, for example, a further connection box with a line connector, in particular a plug, for the data supply of the entertainment system of the aircraft cabin can be provided. This preferred embodiment enables a compact integration of the two connection boxes into one another, which ensures a good clarity.

According to a preferred embodiment, the connection box comprises two, in particular parallel, side walls. These side walls are in particular two longer side walls of the connection box. Both side walls each comprise a receiving portion to receive a support portion of the further connection box and to carry the further connection box therewith. With this configuration, the further connection box can, via its support portions, thus be received on the receiving portions of the one connection box. In other words, the further connection box can, in this embodiment, be provided between and supported by the two side walls. Preferably, the receiving portions are support surfaces which are arranged perpendicular to the respective side wall. In this case, the receiving portions may preferably be formed on the top sides of the side walls and/or parallel to the bottom surface of the connection box. Preferably, the connection box can be attached via these receiving portions also at the underside of a floor of an aircraft cabin. The further connection box can in particular be formed in the shape of a cuboid with protrusions on its top side, which form support portions for bearing on the receiving portions of the connection box. In particular, the protrusions are flat projections, which are formed perpendicular to the side walls of the further connection box.

According to a preferred embodiment, the receiving portions are formed lowered relative to the adjacent regions of the connection box, so as to receive the support portions of the further connection box in these recesses. This configuration makes it possible to integrate the support portions into the connection box in such a way that the external dimensions of the connection box do not change at least in the vertical direction by receiving the further connection box. The result is a particularly compact combination of both connection boxes and the possibility of an easy installation of the combination of both connection boxes on the floor of an aircraft cabin.

Preferably, a side wall of the connection box, in particular a side wall which is shorter than other side walls of the connection box, is preferably recessed at least along the half of the height of the wall. This recess may extend over the entire width of the wall. If the connection box comprises an opening for receiving a line connector, the recess is preferably provided on the same side wall as the opening and particularly preferably above the opening. This configuration provides a free space to improve the accessibility to the line connector of the further connection box when the further connection box is received in the connection box.

According to another embodiment, a side wall, in particular a shorter side wall, of the connection box can be formed inclined relative to the bottom surface of the connection box. This makes it possible to cover a large area of an opening in the floor of the aircraft cabin with a relatively small footprint of the connection box. Thus, it possible to collect a large proportion of condensed water possibly accumulating in the opening in the floor. This effect can be further enhanced if the inclined side wall, preferably in combination with adjacent side walls, form a closed guide for guiding a liquid to the bottom surface of the connection box.

In order to remove any accumulating liquid, e.g. condensed water, in the connection box, the bottom surface may comprise at least one opening for discharging a liquid, in particular water. Several openings are also conceivable here.

Further, an assembly for a system of an aircraft is provided, comprising a connection box having a holder for holding a line connector for the supply of the system of the aircraft. The connection box may be a connection box according to one of the previously described embodiments. Furthermore, the assembly comprises a further connection box with a holder for holding a line connector for the supply of the system of the aircraft. The connection box is configured in such a way that it can receive the further connection box so that both can be mounted on one side of a floor of an aircraft under an opening in the floor so that both connection boxes are accessible from the opposite side of the floor through the opening in the floor of the cabin of the aircraft. In particular, both line connectors are accessible from the opposite side.

Further, a floor element for the floor of an aircraft is provided, comprising an opening, wherein a connection box or an assembly according to one of the embodiments previously described is arranged in the opening.

Moreover, an aircraft with a cabin is provided, comprising a floor element according to the previously described embodiment.

A method for installing a system is provided, in particular an entertainment system, in an aircraft, which preferably uses a connection box according to one of the previously described embodiments, an assembly according to one of the previously described embodiments, or a floor element according to one of the previously described embodiments. The method comprises providing a connection box having a holder for holding a line connector for the supply of the system, arranging a further connection box having a holder for holding a line connector for the supply of the system in the first connection box, and attaching the connection box having the further connection box therein on the underside of the floor of an aircraft under an opening in the floor so that both connection boxes are accessible from the opposite side of the floor through the opening. In particular, the line connectors of both connection boxes are accessible from the opposite side.

With regard to the advantages of the assembly, the floor element, the aircraft and the method, reference is made to the advantages described in combination with the embodiments of the connection box previously described.

FIG. 1 shows a connection box 1, i.e., a first connection box 1, according to an embodiment. The connection box 1 of this embodiment is part of an entertainment system of a cabin of an aircraft. The entertainment system comprises multiple connection boxes and lines with which individual seats of the aircraft cabin are connected to the connection boxes. The connection boxes of the entertainment system are respectively mounted to the underside of the floor of the cabin under an opening in the cabin floor such that the boxes are accessible from the top side of the cabin floor. The connection boxes each provide a plug with which a cable for the connection of a seat to the connection box is connectable.

The connection box 1 according to this embodiment is a connection box for the energy supply of the entertainment system. In addition, the entertainment system comprises a connection box for the data supply. The connection box for the data supply, in this embodiment, is preferably a component which is purchased by the aircraft manufacturer, wherein its dimensions are known and/or standardized. The connection box for the energy supply is preferably produced by the aircraft manufacturer.

The connection box 1 according to this embodiment comprises two parallel side walls 2, 3, a front wall 4, a rear wall 5 and a bottom 6. The walls 2, 3, 4 and 5 and the bottom 6 together form an upwardly open space. The open space is configured such that the further connection box of the entertainment system shown in FIGS. 3 and 4 can be received therein. Specifically, the walls 2, 3, 4 and 5 define a first upper opening 51 to a first internal space 52 of the connection box 1 that is partially enclosed by the walls 2, 3, 4 and 5.

Figure 2:
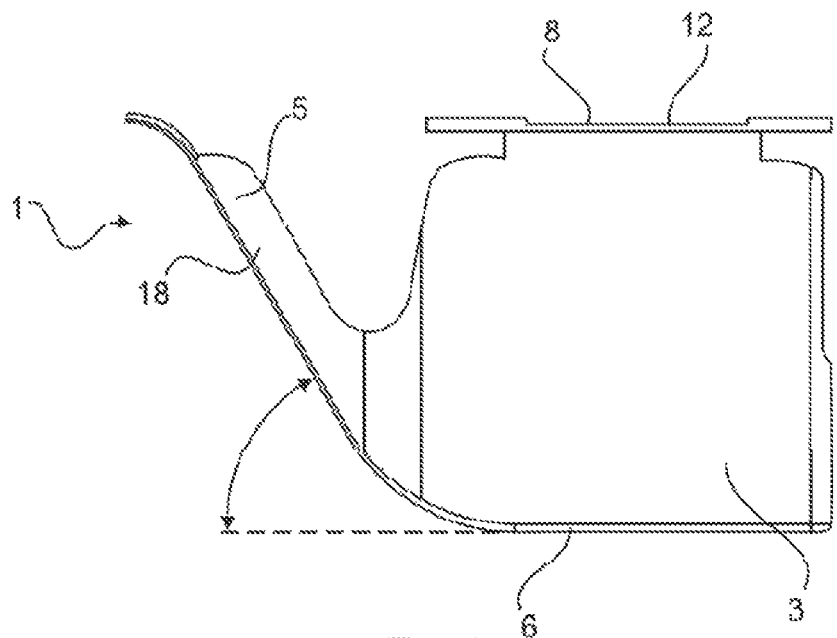
FIG. 2 and FIG. 6 show a side view of the connection box of FIG. 1.
Figure 3:
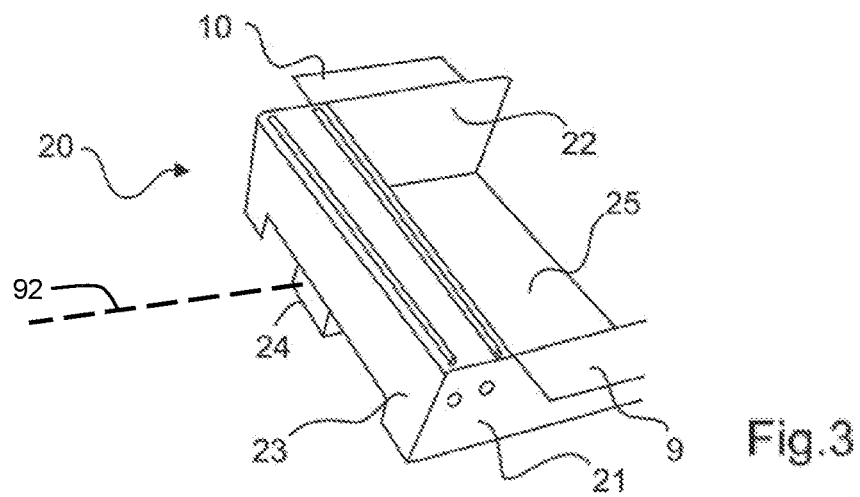
FIG. 3 shows a perspective rear view of a further connection box, which can be received in the connection box according to the embodiment of FIGS. 1 and 2.
Figure 4:
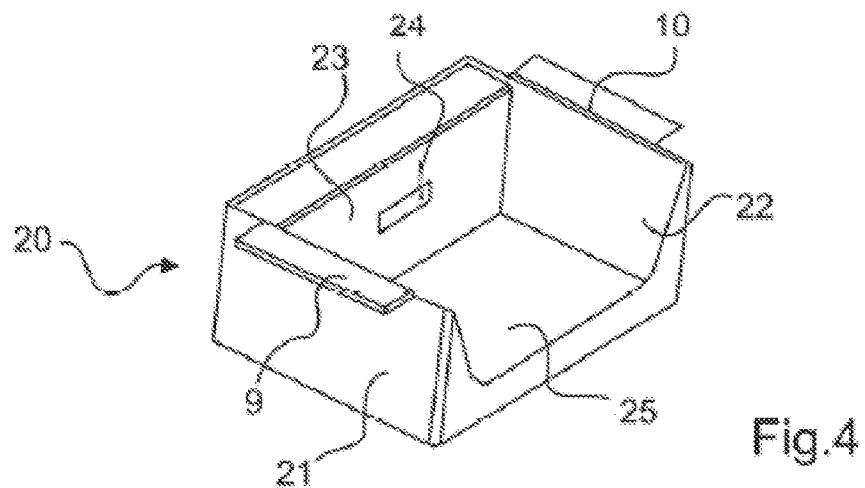
FIG. 4 shows a perspective front view of the further connection box of FIG. 3.
Figure 6:
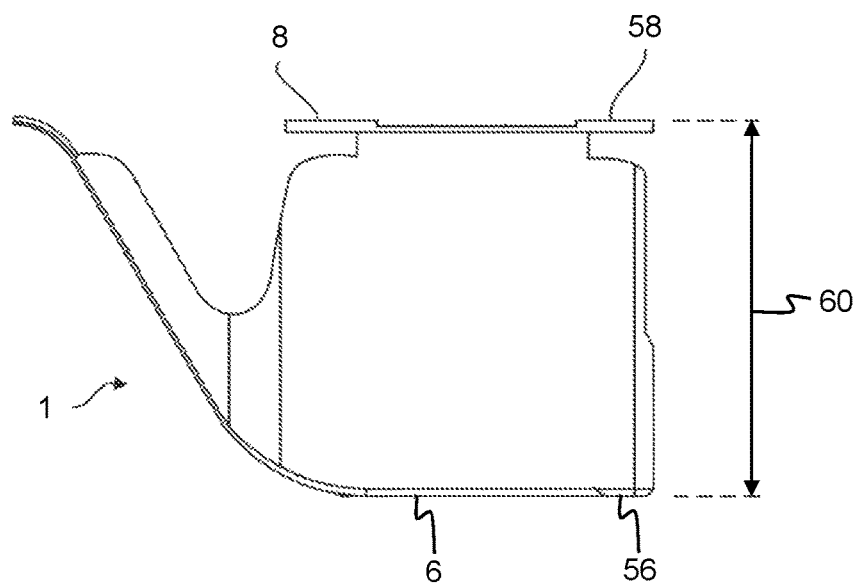

The parallel side walls 2, 3 of the connection box 1 according to this embodiment each comprise a receiving portion 7, 8 for supporting a support portion 9, 10 of the further connection box 20, i.e, a second connection box 20, which is shown in FIGS. 3 and 4. As shown in FIGS. 1 and 2, the receiving portions 7, 8 are formed at the upper, i.e. open side, of the connection box 1 on the parallel side walls 2, 3 as protrusions which preferably extend perpendicularly from the side walls 2, 3 to the outside. The receiving portions 7, 8 may be formed in particular as plate-shaped protrusions, i.e., as protruding receiving portions 7, 8. The protrusions preferably extend along the entire length of the side walls 2, 3. Cross-referencing FIGS. 1, 2 and 6, the receiving portions 7, 8 define a top surface 58 of the connection box 1.

According to this embodiment, the receiving portions 7, 8 comprise recesses 11, 12 on the top side. These recesses 11, 12 are preferably formed such that they can receive the plate-shaped support portions 9, 10 of the further connection box 20, which is shown in FIGS. 3 and 4. Preferably, the recesses 11, 12 extend along the entire width of the receiving portions 7, 8.

The connection box 1 according to this embodiment further comprises a bottom 6, which is preferably formed perpendicular to the parallel side walls 2, 3. In this embodiment, the bottom 6 may comprise a plurality of openings 13. The openings 13 are preferably designed such that water can drain from the connection box 1 through them. Cross-referencing FIGS. 1, 2 and 6, the bottom 6 defines a bottom surface 56 of the connection box 1. Further, a maximum height 60 of the connection box 1 is defined from the bottom surface 56 to the top surface 58.

Furthermore, the connection box 1 comprises a front wall 4. The front wall 4 is recessed in its upper region. The recess preferably extends over the entire width of the front wall 4. In particular, the recess may extend over more than half the height of the side walls 2, 3. In other words, the front wall 4 is connectedly formed to the bottom 6 only in a lower region. The front wall 4 is preferably arranged perpendicular to the bottom 6. Preferably, the front wall 4 is formed in the form of a web which extends between the parallel side walls 2, 3 and in particular has a height which corresponds to less than half of the height of the parallel side walls 2, 3.

The front wall 4 of this embodiment also comprises two openings 14, 15 for receiving a respective plug. In particular, the openings 14, 15 are arranged mirror-inverted relative to a center of the front wall 4. In each of the openings 14, 15, a plug for the energy supply of the entertainment system can be mounted. On the side of the openings 14, 15 facing away from the connection box 1, the plugs can be connected to lines of the aircraft, for example through a first line connector 91. On the other side, i.e. the side of the FIGS. 14, 15, which faces the connection box 1, cables can be connected to the plugs, which cables run from the connection box 1 to the individual seats.

In addition, the connection box 1 comprises a rear wall 5. The rear wall 5 is arranged opposite to the front wall 4 and formed between the parallel side walls 2, 3. The rear wall 5 of this embodiment is formed inclined relative to the bottom 6 of the connection box 1. The angle of inclination between the bottom 6 and the rear wall 5 may amount to about 60°. In particular, the rear wall 5 comprises a tapered shape from the bottom 6 to the top side 16. On the flanks of the tapered shape, protrusions 17, 18 may preferably be formed, which may continue into the parallel side walls 2, 3, so that the inclined rear wall in combination with the protrusions 17, 18 forms a closed channel, which opens out in the bottom 6 of the connection box 1.

The connection box 1 is preferably made of plastic, although other materials are also conceivable here. Also, a combination of different materials is possible.

The connection box 1 is preferably formed such that the receiving portions 7, 8 of the parallel side walls 2, 3 and the top side 16 of the inclined rear wall lie in a plane which is arranged parallel to the bottom 6 of the connection box 1.

According to this embodiment, the connection box 1 preferably has a height of more than 90 mm. The width and length may each amount to approx. 170 mm, wherein the bottom 6 can only have a length of approx. 90 mm but a width of approx. 170 mm.

FIGS. 3 and 4 show a further connection box 20 which is receivable in the connection box 1 according to the present embodiment. The connection box 20 is a connection box for the data supply of the entertainment system. The connection box comprises a cuboid outer shape. The external dimensions of the further connection box 20 amount to a length of 142 mm, a width of 67 mm and a height of 50 mm.

The further connection box comprises two parallel side walls 21, 22, a rear wall 23 and a bottom 25. The further connection box 20 is therefore designed to be open to the top and to the front. The two parallel side walls 21, 22 are formed perpendicular to the bottom 25 and each comprise at the top side a protrusion 9, 10, which in each case forms a support portion for bearing on a receiving portion 7, 8 of the connection box 1. To be more precise, the support portions 9, 10 of the further connection box 20 can be received in the recesses 11, 12 of the connection box 1. The rear wall 23 of the further connection box 20 is preferably formed perpendicular to the parallel side walls 21, 22 and the bottom 25. The rear wall comprises a plug 24. With the side of the plug 24 facing away from the further connection box 20, lines of the aircraft can be connected, such as through a second line connector 92. With the side of the plug 24 facing the further connection box 20, a cable for the data supply of the entertainment system can be connected, which runs from the further connection box 20 to a seat in the cabin of the aircraft.

Figure 5:
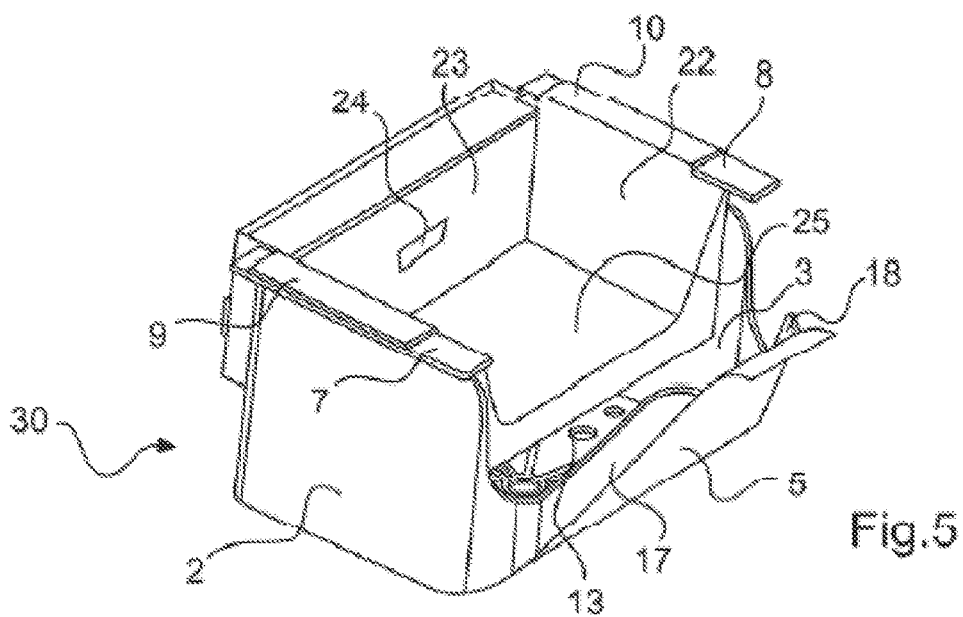
FIG. 5 and FIG. 7 show the connection box according to the embodiment shown in FIGS. 1 and 2, wherein the further connection box shown in FIGS. 3 and 4 is accommodated therein.
Figure 7:
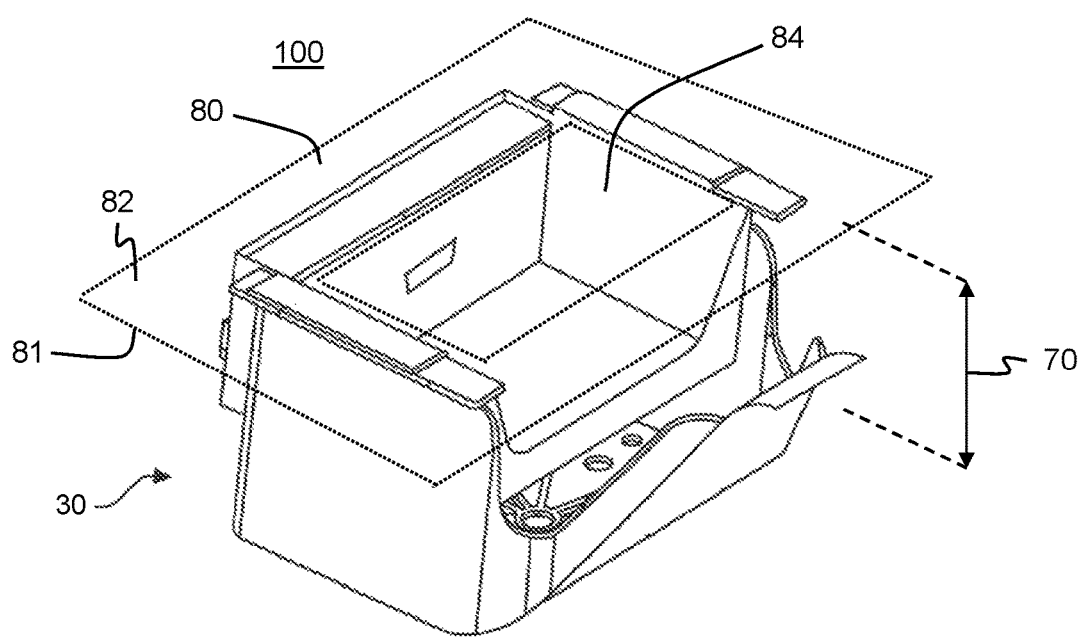

FIG. 5 shows an assembly for forming a combined box structure 30 from the connection box 1 for the energy supply of the entertainment system and the further connection box 20 for the data supply of the entertainment system. As can be seen from FIG. 5, in the combined box structure 30, the further connection box 20 is integrated in the connection box 1 in such a way that it is received in a space which is formed above the openings 14, 15 in the front wall 4. More specifically, the dimensions of the connection box 1 are configured such that the support portions 9, 10 of the further connection box can be received in the recesses 11, 12 of the receiving portions 7, 8 and the further connection box 20 can be integrated into a space between the parallel side walls 2 and 3. The height of the connection box 1 is selected so that the further connection box 20 does not extend into the region of the openings 14, 15, such that the accessibility of the plugs provided in these openings is preserved. Cross-referencing FIG. 5 and FIG. 7, it can be seen that the combined box structure 30 has a maximum height 70 that is equal to the maximum height 60 of connection box 1. Further, FIG. 7 illustrates attachment of the combined box structure 30 to a floor element 80 for a cabin 100. As shown, the floor element 80 has a top side 82 facing the cabin 100 and an opposite bottom side 81, and an opening 84 extending from the top side 82 to the bottom side 81.

The further connection box 20 is thereby received in the connection box 1 so that the plug 24 is arranged in the rear wall 23 of the further connection box 20 at the front wall 4 of the connection box 1. This ensures a good accessibility of the plug 24 of the further connection box 20 via the recess in the front wall 4 of the connection box 1.

The assembly 30 may be mounted by a support device via the receiving portions 7, 8 of the connection box 1 to the underside of a floor of an aircraft. In particular, the assembly may be mounted under an opening in the floor such that the plugs provided in the openings 14, 15 and the plug 24 of the further connection box 20 which is received in the connection box 1 are accessible from the top side of the floor through the openings.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An assembly for a system of an aircraft, comprising:
a first connection box adapted to hold a first line connector, wherein the first connection box has a maximum height from a bottom surface to a top surface, wherein the first connection box includes first side walls that terminate at upper receiving portions formed with a recess, wherein the upper receiving portions form the top surface of the first connection box, and wherein the first connection box defines a first upper opening to a first internal space partially enclosed by the first side walls of the first connection box; and
a second connection box adapted to hold a second line connector, wherein the second connection box includes second side walls that terminate at upper support portions;
wherein the first connection box receives the second connection box in the first internal space to form a combined structure for installation in the aircraft, wherein the upper support portions of the second side walls are received in the recesses of the upper receiving portions of the first side walls when the second connection box is received in the first internal space of the first connection box to form the combined structure, and wherein the combined structure has a maximum height equal to the maximum height of the first connection box.

2. The assembly of claim 1 wherein:
each of the upper receiving portions extends away from the first upper opening and perpendicular to the first side walls;
the second side walls are distanced from one another by a second upper opening; and
each of the upper support portions extends away from the second upper opening and perpendicular to the second side walls.

3. The assembly of claim 1 wherein:
the first connection box includes a first front wall and a first rear wall, and a first bottom, wherein the first side walls of the first connection box interconnect the first front wall and the first rear wall;
the first front wall is formed with a first line opening that receives the first line connector; and
when the second connection box is received in the first internal space of the first connection box to form the combined structure for installation in the aircraft, the first line opening is located above the first bottom and below the second connection box.

4. The assembly of claim 1 wherein:
the first connection box includes a first front wall, a first rear wall, and a first bottom, wherein the first side walls interconnect the first front wall and the first rear wall;
the second connection box includes a second front wall, a second rear wall, and a second bottom, wherein the second side walls interconnect the second front wall and the second rear wall;
the first front wall is formed with a first line opening that receives the first line connector;
the second rear wall is formed with a second line opening that receives the second line connector; and
when the second connection box is received in the first internal space of the first connection box to form the combined structure for installation in the aircraft, the first line opening is located above the first bottom and below the second connection box, and the second line opening is located above the first line opening.

5. The assembly of claim 1 wherein:
the first connection box includes a first front wall, a first rear wall, and a first bottom, wherein the first side walls of the first connection box interconnect the first front wall and the first rear wall;
the second connection box includes a second front wall, a second rear wall, and a second bottom, wherein the second side walls of the second connection box interconnect the second front wall and the second rear wall;
the first front wall is shorter than the first side walls and defines a first upper lateral void in communication with the first internal space;
the second rear wall is formed with a second line opening that receives the second line connector; and
when the second connection box is received in the first internal space of the first connection box to form the combined structure for installation in the aircraft, the second line opening is in communication with the first internal space through the first upper lateral void.

6. The assembly of claim 1 wherein the first connection box comprises:
a first front wall;
a first rear wall; wherein the first side walls interconnect the first front wall and the first rear wall; and
a first bottom, wherein the first rear wall is inclined relative to the first bottom and forms a guide that guides a liquid to the bottom.

7. The assembly of claim 6 wherein the first bottom includes a drain opening that discharges the liquid.

8. The assembly of claim 1 wherein the second connection box has a substantially cuboid-shaped outer shape.

9. An aircraft comprising:
a floor element for a cabin, wherein the floor element has a top side facing the cabin and an opposite bottom side, and wherein the floor element is formed with an opening extending from the top side to the bottom side;
a combined box structure attached to the bottom side of the floor element to allow access to the combined box structure from the top side of the floor element, wherein the combined box structure comprises:
a first connection box holding a first line connector, wherein the first connection box has a maximum height from a bottom surface to a top surface of an upper receiving portion, wherein the upper receiving portion includes a recess, and wherein the first connection box defines a first upper opening to a first internal space partially enclosed by the first connection box; and
a second connection box holding a second line connector, wherein the second connection box is received within the first internal space, wherein the second connection box includes an upper support portion, and wherein the upper support portion of the second connection box is received in the recess of the upper receiving portion.

10. The aircraft of claim 9 wherein the combined structure has a maximum height equal to the maximum height of the first connection box.

11. The aircraft of claim 9 wherein:
the first connection box includes opposite first side walls;
each first side wall terminates at a respective upper receiving portion;
each upper receiving portion is formed with the recess;
the upper receiving portions form the top surface of the first connection box;
the second connection box includes opposite second side walls;
each second side wall includes a respective upper support portion; and
both of the upper support portions of the second side walls are received in the recesses of the upper receiving portions.

12. The aircraft of claim 9 wherein:
the first connection box includes opposite first vertically-extending side walls;
each first vertically-extending side wall terminates in an upward direction at a respective upper receiving portion;
each upper receiving portion extends away from the first upper opening and perpendicular to the first vertically-extending side walls;
the second connection box includes opposite second vertically-extending side walls distanced from one another by a second upper opening;
each second vertically-extending side wall terminates in the upward direction at a respective upper support portion;
each upper support portion extends away from the second upper opening and perpendicular to the second vertically-extending side walls; and
both of the upper support portions of the second side walls are received in the recesses of the upper receiving portions.

13. The aircraft of claim 9 wherein:
the first connection box includes a first front wall, a first rear wall, opposite first side walls interconnecting the first front wall and the first rear wall, and a first bottom;
the first front wall is formed with a first line opening that receives the first line connector; and
the first line opening is located above the first bottom and below the second connection box.

14. The aircraft of claim 9 wherein:
the first connection box includes a first front wall, a first rear wall, opposite first side walls interconnecting the first front wall and the first rear wall, and a first bottom;
the second connection box includes a second front wall, a second rear wall, opposite second side walls interconnecting the second front wall and the second rear wall, and a second bottom;
the first front wall is formed with a first line opening that receives the first line connector;
the second rear wall is formed with a second line opening that receives the second line connector;
the first line opening is located above the first bottom and below the second connection box; and
the second line opening is located above the first line opening.

15. The aircraft of claim 9 wherein:
the first connection box includes a first front wall, a first rear wall, opposite first side walls interconnecting the first front wall and the first rear wall, and a first bottom;
the second connection box includes a second front wall, a second rear wall, opposite second side walls interconnecting the second front wall and the second rear wall, and a second bottom;
the first front wall is shorter than the opposite first side walls and defines a first upper lateral void in communication with the first internal space;
the second rear wall is formed with a second line opening that receives the second line connector; and
the second line opening is in communication with the first internal space through the first upper lateral void.

16. The aircraft of claim 9 wherein the first connection box comprises:
a first front wall;
a first rear wall;
opposite first side walls interconnecting the first front wall and the first rear wall; and
a first bottom formed with a drain opening that discharges a liquid located in the first internal space, wherein the first rear wall is inclined relative to the first bottom and forms a guide that guides the liquid to the bottom.

17. A method for installing a system in an aircraft comprising a floor element for a cabin, wherein the floor element has a top side facing the cabin and an opposite bottom side, and wherein the floor element is formed with an opening extending from the top side to the bottom side, the method comprising:
attaching a combined box structure to the bottom side of the floor element to allow access to each component of the combined box structure from the top side of the floor element, wherein the combined box structure comprises:
a first connection box holding a first line connector, wherein the first connection box has a maximum height from a bottom surface to a top surface of an upper receiving portion, wherein the upper receiving portion includes a recess, and wherein the first connection box defines a first upper opening to a first internal space partially enclosed by the first connection box; and
a second connection box adapted to hold a second line connector, wherein the second connection box is received within the first internal space, wherein the second connection box includes an upper support portion, and wherein the upper support portion of the second connection box is received in the recess of the upper receiving portion.

* * * * *